United States Patent
Riekers et al.

(10) Patent No.: US 8,082,778 B2
(45) Date of Patent: Dec. 27, 2011

(54) ENGINE SIMULATION APPARATUS

(75) Inventors: Uwe Riekers, Weyhe (DE);
Jens-Rasmus Ohst, Worpswede (DE);
Karl Heinz Kleppe, Bremen (DE);
Michael Huhnd, Morsum-Beppen (DE)

(73) Assignee: Airbus Operations GmbH, Hamburg (DE)

( * ) Notice: Subject to any disclaimer, the term of this patent is extended or adjusted under 35 U.S.C. 154(b) by 132 days.

(21) Appl. No.: 12/603,165

(22) Filed: Oct. 21, 2009

(65) Prior Publication Data

US 2010/0101315 A1    Apr. 29, 2010

Related U.S. Application Data

(60) Provisional application No. 61/107,558, filed on Oct. 22, 2008, provisional application No. 61/166,478, filed on Apr. 3, 2009.

(30) Foreign Application Priority Data

Oct. 22, 2008 (DE) .......................... 10 2008 043 102
Apr. 3, 2009 (DE) .......................... 10 2009 002 184

(51) Int. Cl.
*G01M 15/00* (2006.01)
(52) U.S. Cl. ............... 73/118.02; 73/112.01; 73/116.03; 73/118.03
(58) Field of Classification Search ............... 73/112.01, 73/116.03, 118.02, 118.03, 147
See application file for complete search history.

(56) References Cited

U.S. PATENT DOCUMENTS

| | | | | |
|---|---|---|---|---|
| 4,033,185 | A * | 7/1977 | McNally et al. | 73/147 |
| 4,034,604 | A * | 7/1977 | Decher et al. | 73/147 |
| 4,189,939 | A * | 2/1980 | West et al. | 73/116.03 |
| 4,691,561 | A * | 9/1987 | Ganz et al. | 73/118.03 |
| 4,742,709 | A * | 5/1988 | Angel | 73/118.03 |
| 6,772,627 | B2 * | 8/2004 | Fleming | 73/147 |
| 6,923,051 | B2 * | 8/2005 | Fleming | 73/147 |
| 7,024,929 | B2 * | 4/2006 | Fleming et al. | 73/147 |

OTHER PUBLICATIONS

Kemp, B.C., AIAA 94-2554 "Next Generation Propulsion Simulation Equipment for Use in Wind Tunnels", $18^{th}$ *AIAA Aerospace Ground Testing Conference*, Jun. 20-23, 1994, Colorado Springs, CO.

* cited by examiner

*Primary Examiner* — Freddie Kirkland, III
(74) *Attorney, Agent, or Firm* — Jenkins, Wilson, Taylor & Hunt, P.A.

(57) ABSTRACT

The present invention relates to a turbofan propulsion simulator means, in particular for a turbofan of an aircraft or spacecraft, wherein the turbofan propulsion simulator means comprises a modular configuration, wherein the turbofan propulsion simulator means comprises a module, wherein the module is a turbine means to drive the turbofan of the turbofan propulsion simulator means, wherein the turbine means can be coupled with at least two fan means, characterized in that, the at least two fan means to be connected with the turbofan propulsion simulator means comprises almost or essentially the same mass and/or almost or essentially the same barycentre.

10 Claims, 10 Drawing Sheets

ENGINE SIMULATION APPARATUS

CROSS-REFERENCE TO RELATED APPLICATIONS

This application claims the benefit of U.S. Provisional Applications No. 61/107,558 filed Oct. 22, 2008 and No. 61/166,478 filed Apr. 3, 2009 and of German Patent Applications No. 10 2008 043 102 filed Oct. 22, 2008 and No. 10 2009 002184 filed Apr. 3, 2009, the entire disclosure of which is herein incorporated by reference.

BACKGROUND OF THE INVENTION

The present invention relates to an engine simulation apparatus. In particular, the present invention relates to a Turbofan Propulsion Simulator (TPS).

Such engine simulation apparatuses and/or TPS apparatuses are generally used in wind tunnel models in order to simulate the actual and/or real engine performance characteristics. ATPS apparatus usually has an engine powered by compressed air, which provides the required amount of air within a short period of time for driving the engine. The aerodynamic characteristics of the engine, that is for example the engine pressure ratio and the mass flow, should be substantially the same as those of an original engine that is to be simulated.

Because compressed air is used to drive the engine and/or the turbine instead of a compressor and a burning chamber in front of the turbine, a corestream is not correctly represented, i.e. with regard to temperature and mass flow. However, in order to arrive at a good simulation of the original engine, it is necessary to reach the same jet outlet mach number in the core stream. Further, it is important to reduce the mass flow to a minimum. Therefore, different TPS apparatuses exist for a plurality of wind tunnel models with a defined scaling for different model scales.

Until now, each TPS apparatus has been designed for a specific operating point and/or a specific engine having a specific size. The driving turbine therein is designed for an operating point of a specific turbine. The entire design of such an apparatus is therefore very compact and complex. Furthermore, a very complex oil lubrication, a very specific sealing system and a carefully designed bearing system are required, which due to the high loads and rotational speeds, for example, of up to 80.000 RPM, are to be taken account of for such a small apparatus as for example shown in FIG. 14 hereinafter.

Further, an exact dynamic calculation and an adaptation of the natural bending frequencies of the entire rotor system are required. Therefore, the main housing comprising the turbine, the shaft and the bearing installations is a very expensive part. Furthermore, it is the part that requires the most time during design and/or development, production and assembly. The total cost for the development and production of a new apparatus are very costly and account for a period of time of approximately two years.

Moreover, there is currently the requirement that new engine simulation apparatuses and/or TPS apparatuses for a new turbine generation are developed and produced, which account for very large bypass ratios that for example cater for a passenger aircraft of the type Airbus A350, and can also thought to be used in new short distance aircraft. Known TPS apparatuses do not display the required aerodynamic characteristics of a fan means to simulate this new turbine generation, including the characteristics of engine performance and engine size.

Further, in the document AIAA 94-2554 "Next Generation Propulsion Simulation Equipment for Use in Wind Tunnels" by B.C. Camp from the 18$^{th}$ AIAA Aerospace Ground Testing Conference, Jun. 20-23, 1994 in Colorado Springs generally describes to use an available TPS apparatus and to provide the same with different fan means in order to carry out the engine simulation. Only retrofitting of an available TPS apparatus has however the disadvantage that engine simulation experiments can only be done on the basis of predefined settings and operating parameters of the TPS apparatus. Such an available TPS apparatus is, however, not meant to nor configured to simulate new engine generations. In particular, a turbine unit of an available, old engine of a manufacturer is usually a type of blackbox. That means one usually does not know the inner details in order to, for example, carry out a rotor dynamics calculation or the like. Further, there is a great number of such old engines, which are all not suitable for future wind tunnel tests, because the fan performance does not suit modern engines. Retrofitting old, available engines with a new fan means representing nowadays engines would prevent new developments. Since there are many old engines of different size, one can with relatively small means provide a completely new engine family, which modularly complement one another and cover the entire size and performance range.

One objective of the present invention is therefore to provide an approved engine simulation apparatus and an improved method for engine simulation.

SUMMARY OF THE INVENTION

Accordingly, an engine simulation apparatus, in particular for an engine of an aircraft or a spacecraft, is provided, wherein the engine simulation apparatus comprises a module, which has a turbine means for driving of an engine of the engine simulation apparatus, wherein the turbine means can be coupled with at least two fans, wherein the at least two fans for connecting with the engine simulation apparatus have almost or substantially the same mass and/or almost or substantially the same centre of gravity.

Due to the fan means of the engine simulation apparatus having a similar or almost the same mass or substantially the same mass, substantially the same dynamic behaviour of the entire rotor system of the engine simulation apparatus can be achieved. This further has the advantage that the accuracy of the measuring results can be substantially improved and further, possible damage of the engine simulation apparatus due to unwanted resonances and/or vibrations can be prevented. The same also applies, when the fan means have a similar or almost the same centre of gravity or substantially the same centre of gravity.

The modular design of the engine simulation apparatus further has the advantage that the simulation apparatus can be easily modified and/or retrofitted in accordance with different original engines, which are to be simulated, without having the need to design and manufacture a separate engine simulation apparatus for every original engine, which is to be simulated. Thereby, time and cost can be substantially reduced. Therein, the engine simulation apparatus having the modular design has the advantage that it can be connected with different fan means or different engines, wherein the fan means can, for example, differ in their scaling and/or dimensions and/or power performance and/or performance from one another. This has the advantage that by means of this engine simulation apparatus having a modular design, for example, fan means with different diameters can be operated.

Advantageous embodiments of the invention are described in the dependent claims as well as in the description with reference to the drawings.

In this modular embodiment of the invention the turbine means accounts for a designed bearing housing means, which as a part of the module engine simulation apparatus, provides the advantage that this bearing housing means does not need to be designed for every engine which is to be simulated together with the turbine means. Therefore, the engine housing means with its complex bearings and lubrication can be used for different engine simulations. This results in a substantial saving of cost and time, since the development and manufacturing of the turbine means and the bearing housing means are complex and expensive.

In a different modular embodiment according to the invention, at least two fans, which can be coupled and/or connected to the turbine means, have, for example different dimensions and/or a different power performance, respectively. This embodiment of an engine simulation apparatus provides the advantage that its modular design allows for the simulation of different engines and does not limit the same; in particular with reference to the different dimensions or different power performances of the engines, which are to be simulated.

According to a further modular embodiment of the invention, at least two fan means, which can be coupled or connected to the turbine means, have different or the same diameters and/or at least a different or the same performance and/or substantially the same power performance, respectively. This has the advantage that besides previous fan means having a diameter of, for example, 5 Inches, also fan means with larger or smaller diameters can be tested with an equally used turbine means, as described hereinafter, for example particular, with reference to the FIGS. 5 to 10.

In a further modular embodiment of the present invention, a respective fan has a predefined fan range. Therein, a turbine outlet can, for example, be adapted such that, for example, a predefined mach number can be set. This has the advantage that, when, for example, turbine mass flow is increased, thereby in turn increasing the mach number, the mach number can be lowered by this measure.

In a further modular embodiment of the invention, at least one or more turbine operating maps are provided, wherein based on the corresponding turbine operating map, for example a turbine mass flow and/or an inlet pressure for the engine to be simulated can be set. This has the advantage that, for example, when in an existing engine simulation apparatus a new fan means is provided, which has an increased performance at a lower RPM, this change in power performance can be covered by a corresponding turbine operating map in most cases. In this way, for example, the turbine mass flow and inlet pressure can be suitably increased across a corresponding turbine operating map in this case.

According to a further modular embodiment of the present invention, a respective fan means is configured such as to at least reduce resonant vibrations or substantially prevent resonant vibrations. Thereby, damages of the engine simulation apparatus can be prevented and its life can be increased.

According to the invention, furthermore, a method for simulating an engine for an aircraft or a spacecraft is provided, having at least one or more modular engine simulation apparatuses according to the present invention.

In a further embodiment of the invention, the design of the turbine means and/or the rotor dynamics depends on the fan means, which can be used with the turbine simulation apparatus and/or is adapted to the fan means. Thereby, for example, the power performance of the turbine simulation apparatus and the motor dynamic behaviour can be estimated and/or calculated in advance.

According to a further embodiment of the present invention, the engine simulation apparatus is configured such that it exhibits a predefined power performance and/or machine dynamic behaviour. Because of the power performance and/or the machine dynamic behaviour of the engine simulation apparatus being known, the engine simulation apparatus can be, in accordance with the engine to be tested, retrofitted correspondingly without problems, without the retrofitting resulting in an unexpected machine dynamic behaviour or the power for testing the engine to be tested proves to be insufficient.

The present invention is hereinafter described with reference to the accompanying drawings in more detail.

SHORT DESCRIPTION OF THE DRAWINGS

The figures show.

DETAILED DESCRIPTION OF THE FIGURES

In the figures, the same reference signs refer to the same or functionally equivalent components, has not specified otherwise.

Jet engines nowadays are mostly configured as turbine jet engines. This type of turbine jet engine sucks in surrounding air and compresses this air in a compressor, which results in a corresponding increase of pressure. In a subsequent combustion chamber fuel is injected and the mixture is combusted. Because of the combustion, the temperature and the flow velocity is increased. In a subsequent turbine, the flow energy in the gas is converted into a mechanical rotational movement, wherein the gas expands partially. The gas expands into a thrust nozzle, arranged behind the turbine, wherein the flow velocity increased further. In the thrust nozzle, the actual forward thrust is produced by the exhausting gas.

Figure 1:
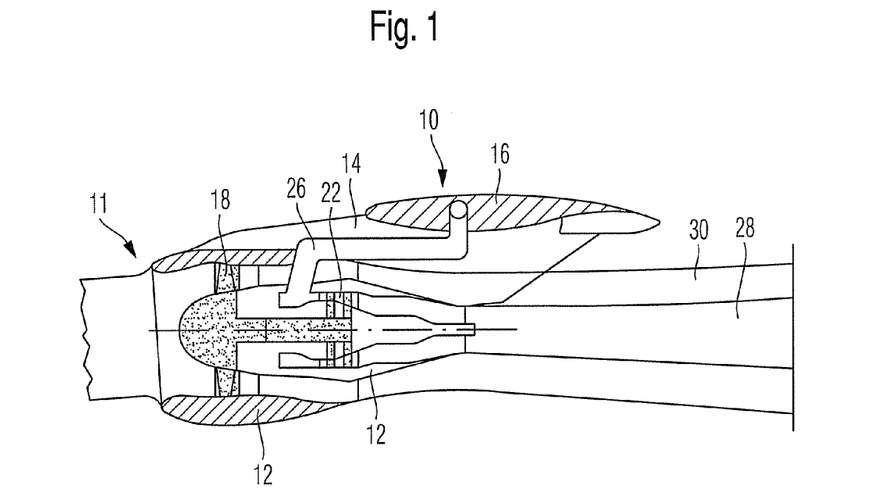
FIG. 1 a schematic section view of an engine simulation apparatus and/or a TPS apparatus with indicated flow lines.

In FIG. 1, there is now shown a sectional view of an example of an engine simulation apparatus 10 and/or TPS (turbo fan propulsion simulator) apparatus. The engine simulation apparatus 10 therein has, for example, engine pod means 12 attached to a pylon 14 and/or a handle-shaped carrier underneath the wing 16. Inside the engine pod means 12, there is, amongst others, an engine fan means 18 and a turbine means 20 having a bearing housing means 22 and a shaft 24 arranged.

The fan means 18 is powered by means of compressed air that is provided to the turbine means 22 via a compressed air channel 26 to power the fan means 18 and/or the engine 11. This compressed air forms a core air mass flow 28. Furthermore, the fan means 18 being powered by the turbine means 20 sucks in air. The air mass flow, which is sucked in by the fan means 18 and is compressed by the same, forms, after existing from the fan nozzle, the fan jet air flow 30.

Figure 2:
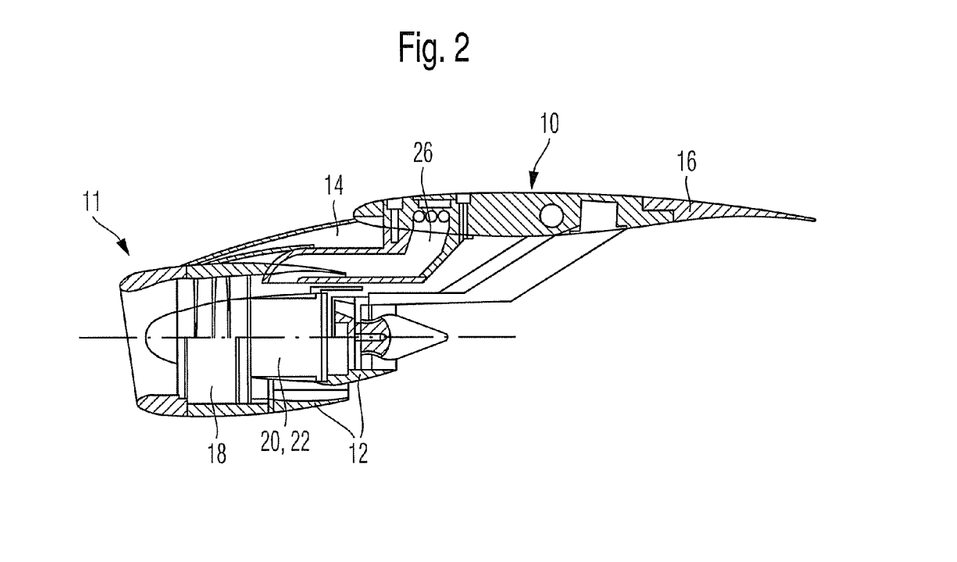
FIG. 2 a section view of the engine simulation apparatus according to FIG. 1, without the flow lines.

FIG. 2 is a section view of the engine simulation apparatus 10 according to FIG. 1 without the air mass flow being shown. Like in FIG. 1, the pylon 14 is shown at the wing 16, to which the engine pod means 12 is fastened. Furthermore, the supply line 26 for the compressed air for the turbine means 20 is shown. Moreover, the fan means 18 and the turbine means 20 are shown in a partial section view.

Figure 3:
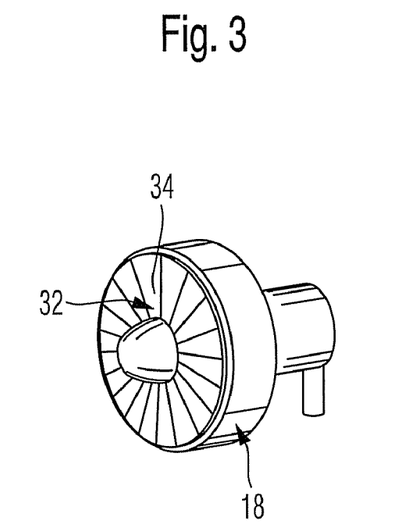
FIG. 3 the engine simulation apparatus in an assembled state.
Figure 4:
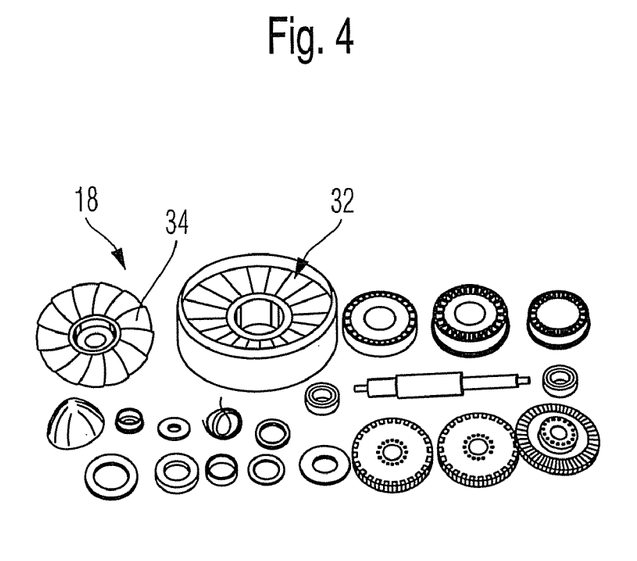
FIG. 4 components of the turbine simulation apparatus of FIG. 3.

Furthermore, in FIG. 3, the engine simulation apparatus 10 is shown in an assembled state and, in FIG. 4, components of the fan means 18 are shown. The fan means 18 comprises an air inlet 32 having a rotor 34 that is arranged on a shaft 36.

Due to new developments of such engine simulation apparatuses being complex and expensive, now, according to the invention, a modular engine simulation apparatus and/or TPS apparatus is developed and used in the same or, depending on what is to be simulated, suitably fitted or modified. In this way, new developments (from scratch) of the turbine simulation apparatus for every turbine type can be dispensed with in each case, thereby saving time and money.

Such a new development has furthermore the advantage that the turbine design and/or rotor dynamics can be adjusted to the fan/or the fan means or the fans and/or the plurality of fan means. Thereby, the power performance and the machine dynamic behaviour can be determined and/or estimated. With presently available units, this is not possible in this way as such details are usually not known. As previously described, for example, a turbine unit of an available, old engine of a manufacturer is usually a type of "blackbox". That means that one does not know the inner details in order to, for example, carry out a rotor dynamics calculation or the like.

In principal, according to invention, it is however possible to modify an available engine simulation apparatus, wherein the same is provided with different fan means depending on which type of fan means is to be simulated within the engine simulation experiment. However, the respective means—on the contrary to the previously described technique—is selected/provided such that it produces no or substantially no unwanted resonances in the engine simulation apparatus. For this purpose, fan means are provided, which have a mass and/or a centre of gravity that produces no or substantially no or only resonances that do not result in damaging of the engine simulation apparatus or in a substantial falsification of measuring results. Furthermore, the different means, with which the engine simulation apparatus is provided, preferably have the same or substantially the same mass and/or the same or substantially the same centre or gravity. At least, the fan means should have a similar mass and/or similar centre of gravity.

Therein, for example, a modular engine simulation apparatus and/or modular TPS apparatus is now provided. The modular engine simulation apparatus and/or TPS apparatus has, for example, a turbine means and a bearing housing means, which are capable of driving different engines, for example with different diameters and/or different performance characteristics as is to be described in the following with reference to FIGS. 5 to 10.

Figure 5:
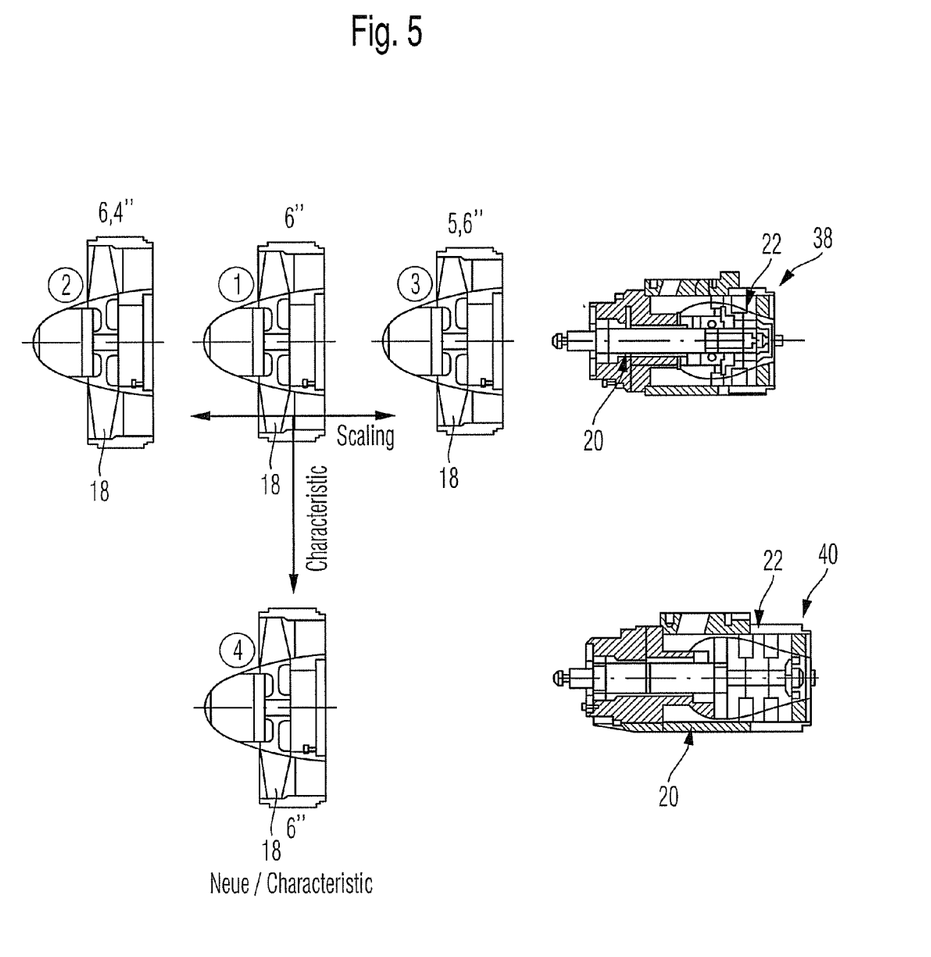
FIG. 5 a section view of different fan means and two different modules, each comprising a turbine means and bearing housing means thereof, wherein the modules are combined with the fan means to four engine simulation apparatuses.

FIG. 5 shows a view of a module 38 according to the present invention of an engine simulation apparatus 10 and/or a TPS apparatus. Furthermore, the FIGS. 6 to 10 show the consequences for such performance values.

In FIG. 5, four different fan means 1, 2, 3, 4 are shown for example. Therein, one existing fan means 1 and three new variants 2, 3 and 4 of fan means 18 are shown.

Two of the new variants 2, 3 of the fan means 18 differ from the fan means 1 with regard to the diameter. For the first variant 2, this diameter is 6.4 Inches and therefore larger as the diameter for the second variant 3 having 5.6 Inches, being therefore smaller than the diameter of 6 Inches of the fan means 1. Furthermore, the third, new variant 4 of the fan means has substantially the same diameter of 6 Inches as the fan means 1, however, it has a different, new characteristic and/or performance.

For simulation of the corresponding engines with these fan means 1 to 4, now, two types of turbine means 20 with bearing housing means 22 as a module 38 and/or 40 can be used. The first turbine means 20 with bearing housing means 22 can serve as a first module 38 for the fan means 1 and the first two variants 2 and 4 of the fan means 18 having different diameters in comparison to the fan means 1.

The second turbine means 20 with bearing housing means 22 on the other hand, forms the second module 40 and is used for the third, new variant 4 of the fan means 18 also having a diameter of 6 Inches like the fan means 1, however, having different and/or new characteristic and/or performance. In total there are therefore provided four engine simulation apparatuses 10 simulating four different engines, wherein the engine simulation apparatuses 10 each have a suitable module 38, 40 of turbine means 20 with bearing housing means 22.

Figure 6:
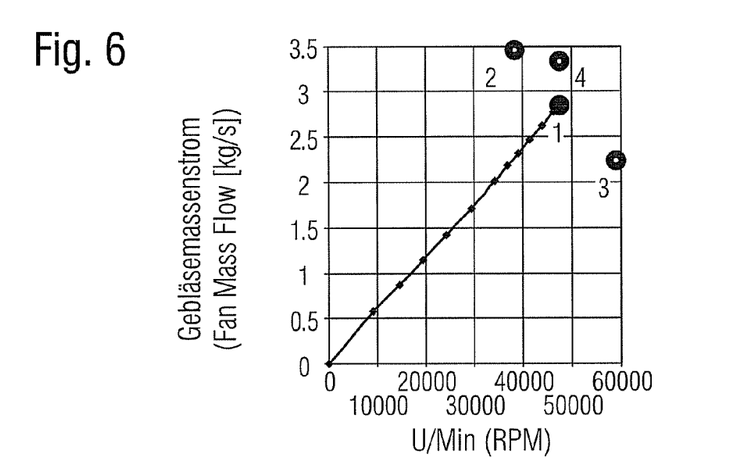
FIG. 6 a diagram, in which the fan mass flow is shown in relation to the RPM for the four engine simulation apparatuses.

In the diagram, as shown in FIG. 6, the rotational speed of the engines in relation to the fan mass flow is illustrated.

In this, there is, on the one hand, the characteristics for the fan means 1 and/or its engine simulation apparatus shown being operated across the first module of the turbine means with the bearing housing means and, on the other hand, there is shown one operating point for the three, new variants of the fan 2 to 4 and/or their simulation means 2 to 4, respectively. This applies to all diagrams in the FIGS. 6 to 10.

From the diagram in FIG. 6, it can be deduced that, for example, using the first variant of the fan means 2/or its engine simulation apparatuses, a higher fan mass flow at a lower rotational speed can be achieved than using the fan means 1 and/or its simulation apparatus. Furthermore, using the second variant 3 a higher rotational speed at a lower fan mass flow can be achieved than in the fan means 1.

Figure 7:
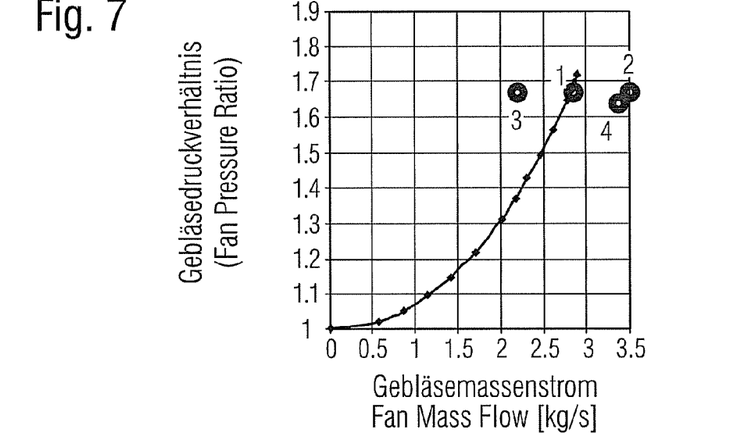
FIG. 7 a diagram, in which the fan mass flow is shown in relation to the fan pressure ratio for the four engine simulation apparatuses.

In FIG. 7 a diagram is shown, in which the fan mass flow is shown in relation to the fan pressure ratio.

Therein, the first and third variant of the fan means 2, 4 and/or their engine simulation means display a higher fan mass flow at the same fan pressure ratio in comparison to the fan means 1. Further, the second variant of the fan means 3 has a lower fan mass flow at the same fan pressure ratio in comparison to the fan means 1.

Figure 8:
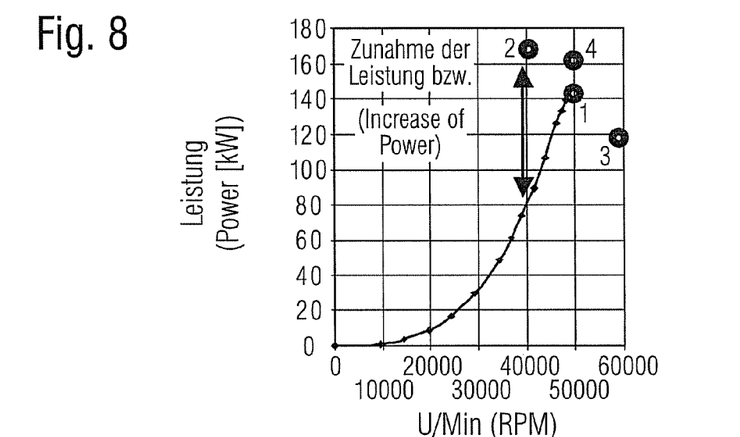
FIG. 8 a diagram, in which the rotational speed is shown in relation to the power output for the four engine simulation apparatuses.

Further, in FIG. 8, the rotational speed in relation to the power output of the engine is illustrated.

Therein, the first variant of the fan means 2 has a significantly higher power output at a lower rotational speed in comparison to the fan means 1 and/or its engine simulation apparatus. The third variant of the fan means 4/or engine simulation apparatus also has a higher power output at the same rotational speed in comparison to the fan means 1 and/or its engine simulation apparatus. The second variant 3 again has a lower power output a higher rotational speed in comparison to the fan means 1 and/or its engine simulation apparatus.

Figure 9:
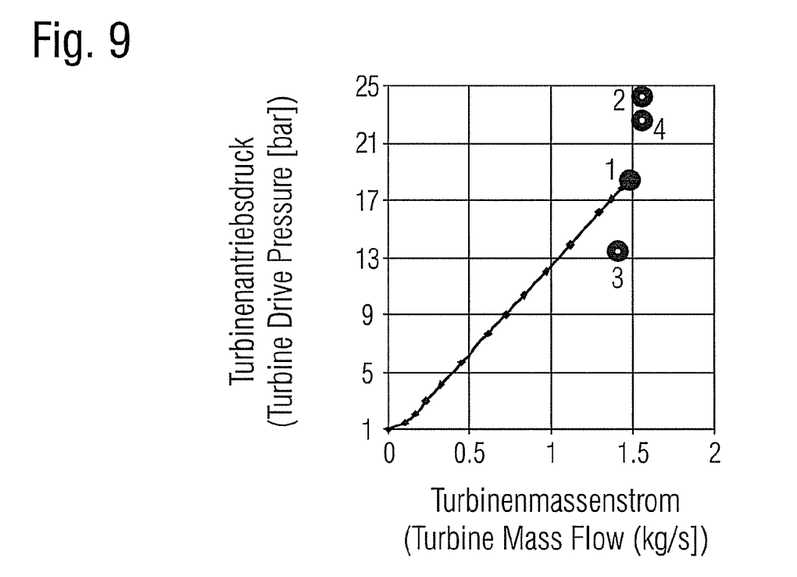
FIG. 9 a diagram, in which the turbine mass flow is shown in relation to turbine driving pressure for the four engine simulation apparatuses.

In FIG. 9 there is a diagram shown, in which the turbine mass flow in relation to the turbine driving pressure is illustrated.

Therein, the turbine driving pressure in the first and third variant 2, 4 of the fan means and/or engine simulation means is higher than the fan means 1 at the same turbine mass flow. The second variant 3 of the fan means and/or its engine simulation apparatus has at the same turbine mass flow a smaller turbine driving pressure in comparison to the fan means 1 and/or its turbine simulation apparatus.

Figure 10:
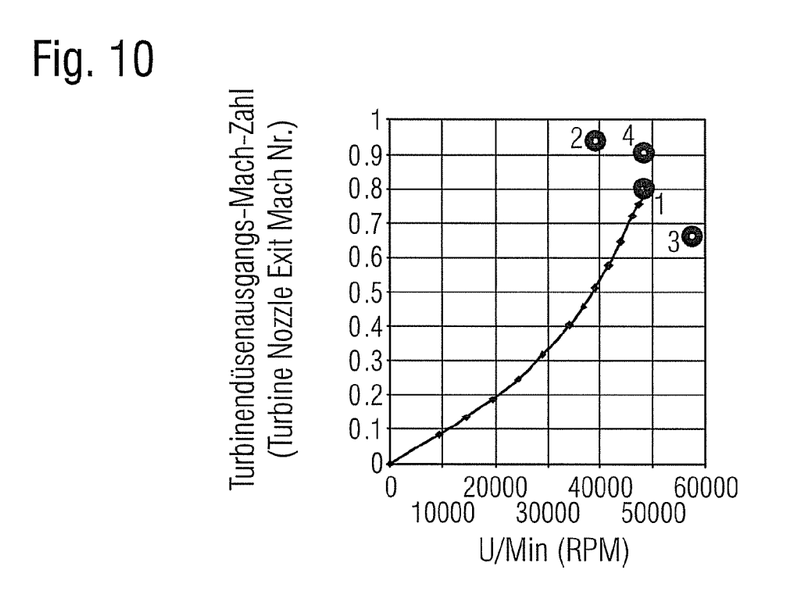
FIG. 10 a diagram, in which the rotational speed is shown in relation to the turbine outlet mach number for the four engine simulation apparatuses.

Further, in FIG. 10, a diagram is shown, in which the rotational speed in relation to the turbine outlet mach number is illustrated.

Therein, the first and third variant 2, 4 of the fan means 1 and/or turbine simulation apparatuses have a higher turbine nozzle outlet mach number at the same rotational speed, in comparison to the fan means 1 and/or its engine simulation apparatus. The second variant 2 of the fan means/or its engine simulation apparatus again has higher rotational speed at the same turbine nozzle outlet mach number in comparison to the fan means 1 and/or its engine simulation apparatus.

In summary with regard to FIGS. 5 and 10, it can be said that by means of the two modules that, for example, have a turbine means with a bearing housing means respectively, different turbines can be simulated and therein, the development of a separate turbine means with a spearing housing means for each variant of fan means within a turbine simulation means can be dispensed with, respectively.

If now, for a predetermined turbine performance of a modular turbine simulation apparatus and/or TPS apparatus, a new turbine fan means is to be provided, which, for example requires a higher power output at a lower rotational speed, as for example, the first and third variants 2, 4 of the fan means in FIG. 8, then in this case, the existing turbine performance operating map can in most cases sufficiently cover these changes, for example, by increasing the turbine mass flow by a predetermined amount or the inlet pressure.

The increased turbine flow again results, for example, in an increased turbine nozzle outlet mach number. In this case, by increasing the turbine nozzle outlet area, the mach number can again be increased.

Figure 11:
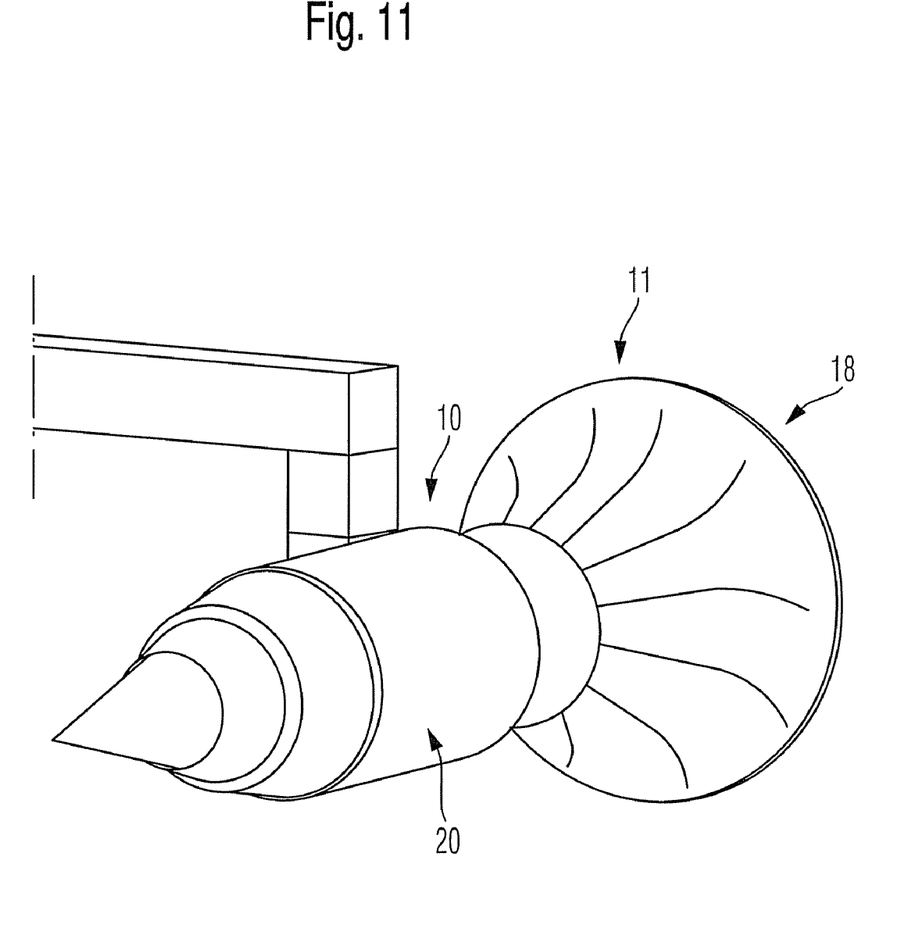
FIG. 11 a view of a modular engine simulation apparatus according to the invention in a performance test.
Figure 12:
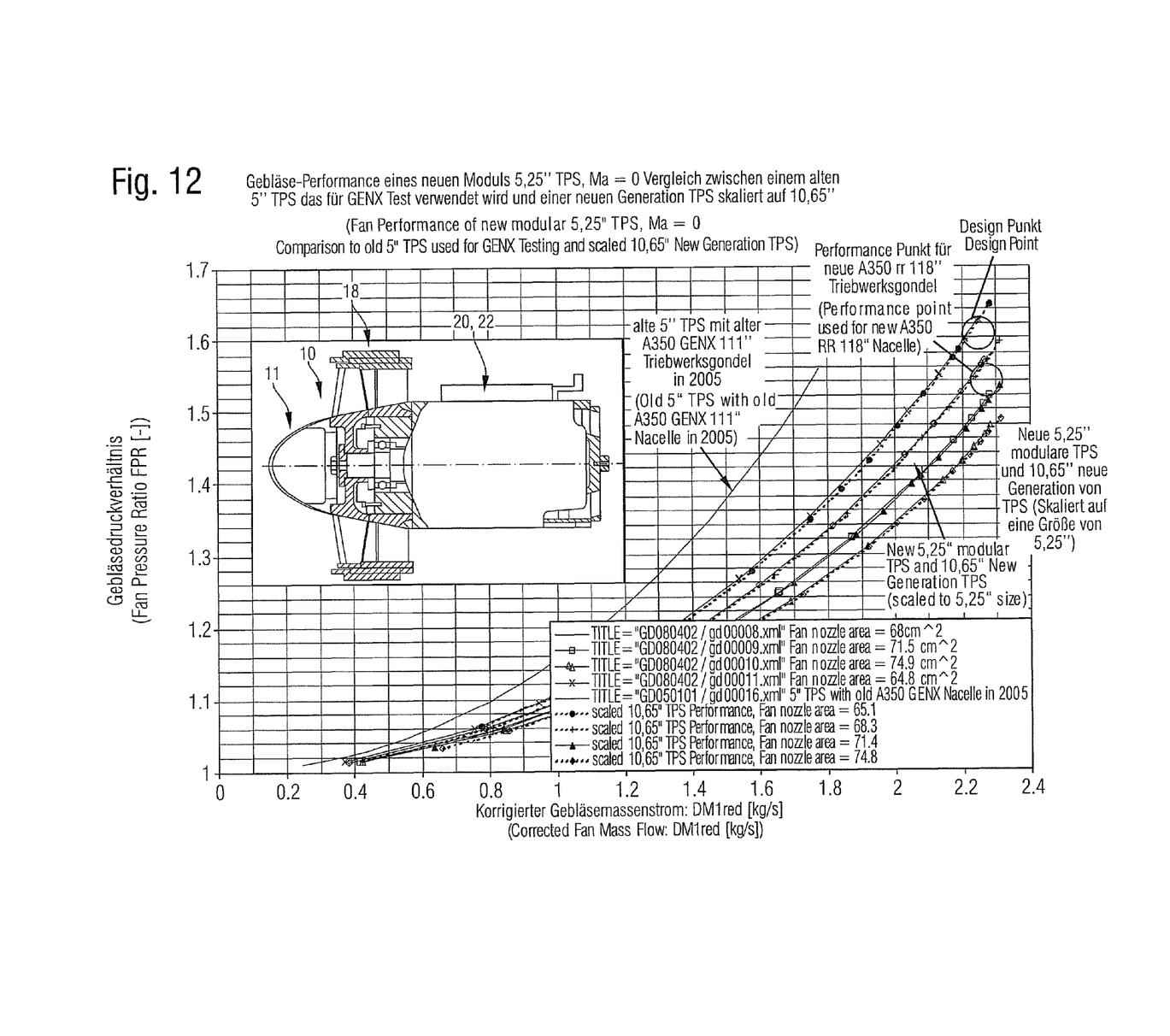
FIG. 12 a diagram, in which the corrected fan mass flow is shown in relation to a fan pressure ratio (FPR) for different turbine simulation apparatuses as well as a section view of a turbine simulation apparatus according to the invention.

Theoretically, a change in the core fan mach number now results in change of turbine performance. One does however know, from the first demonstration test, as shown in FIGS. 11 and 12 hereinafter, that the influence on the specific turbine design of a turbine simulation apparatus and/or TPS apparatus is relatively small as the mach number is relatively high in the last turbine stages. A change in the fan area has, however, substantially has no influence on the performance and/or the power performance.

In a further case, a different engine rotor or fan rotor, which is installed on a existing turbo machine, changes the natural frequency of the rotor system, which can produce resonant vibrations within the operating range. This has to be carefully investigated, which is very complex and which is for engine simulation apparatuses with unknown parts inside not easily possible. The solution thereto, according to the invention, is now to focus the design of a new engine and/or fan means for the same on having substantially the same mass and/or substantially the same centre of gravity or the difference in the mass and/or in the centre of gravity to be sufficiently small such that resonant vibrations are prevented or reduced to a suitable size such that inaccurate measurement results or even damages on the engine simulation apparatus can be prevented. The use of a fan means having substantially the same or almost the same centre of gravity and/or mass has the advantage that this results in substantially the same dynamic performance of the entire rotor system.

The advantage of the invention lies in that engine simulation apparatuses having a modular design can be used or existing engine simulation apparatuses can be modified and therefore fewer engine simulation apparatuses have to be used in order to be more flexible for the definition of model scales and to be quicker in the operation of motorized WT-tests.

The time and cost of the development of a modular engine simulation apparatus are significantly lower than the development of engine simulation apparatuses for a specific engine type respectively. The modification with a new engine of an existing engine simulation apparatus is, for example, approximately one third of a completely new development. The required time plan for this lies around 12 months, rather than 24 months for a completely new development back in the past. The modular engine simulation apparatus according to the invention allows therefore for substantial savings in cost and time.

For the first performance test of an airbus the type A350 with a model 503_4 such a new, modular engine simulation apparatus and/or TPS apparatus was realized as described hereinafter with reference to FIGS. 11 and 12.

Therein, FIG. 11 shows an engine simulation apparatus 10 according to the invention. Here, an old, existing engine simulation apparatus, that is for example a TDI 1500, was modified. The engine of the original engine simulation apparatus with a diameter of 5.0 Inches was too small. Furthermore, the engine pressure ratios and/or the fan pressure ratio FPR was too large and the mass flow too small. Therefore, a new engine design was installed. The new engine has a new engine fan means with a diameter of 5.25 Inches, a lower engine pressure ratio and/or fan pressure ratio FPR and a reduced mass flow. Furthermore, the new engine requires more power and a lower rotational speed. The new fan means herein have substantially the same mass and the same center of gravity as the original fan means in order to prevent resonant vibrations and to ensure substantially the same dynamic behaviour of the entire rotor system.

FIG. 11 shows the performance test with this new engine simulation apparatus 10 according to the invention, which is based on the modified, existing engine simulation apparatus, here TDI 1500.

FIG. 12 shows furthermore new engine characteristics in comparison to existing, available engine characteristics. The turbine nozzle mach number therein can, for example, be adjusted to a low or lower level by increasing the fan area without changing turbine performance. The fan area in this turbine simulation apparatus according to the invention is 68 cm², 71.5 cm², 74.9 cm² and 64.8 cm². However, these values are only exemplary and the invention is not limited to these values. Therefore, the fan area can also be smaller than 64.8 cm² and larger than 74.9 cm², depending on the function and the intended use.

The dynamic behaviour of the engine simulation apparatus according to the invention is very good herein. As shown in FIG. 12, using the engine simulation apparatus according to the invention with a diameter of 5.25 Inches, a higher fan mass flow can be achieved at the same engine pressure ratio and/or fan pressure ratio FPR in comparison to an existing engine simulation apparatus having a diameter of 5.0 Inches.

The engine simulation apparatus 10 according to the invention is also shown in the diagram of FIG. 12 showing additionally a section view. Here, the turbine means 20 with a bearing housing means 22 of the existing engine simulation apparatus TDI 1500 is being used. However, the fan means of TDI 1500 having a diameter of 5.0 Inches is substituted and/or modified by a module of a fan means 18 having a larger diameter of 5.25 Inches.

Figure 13:
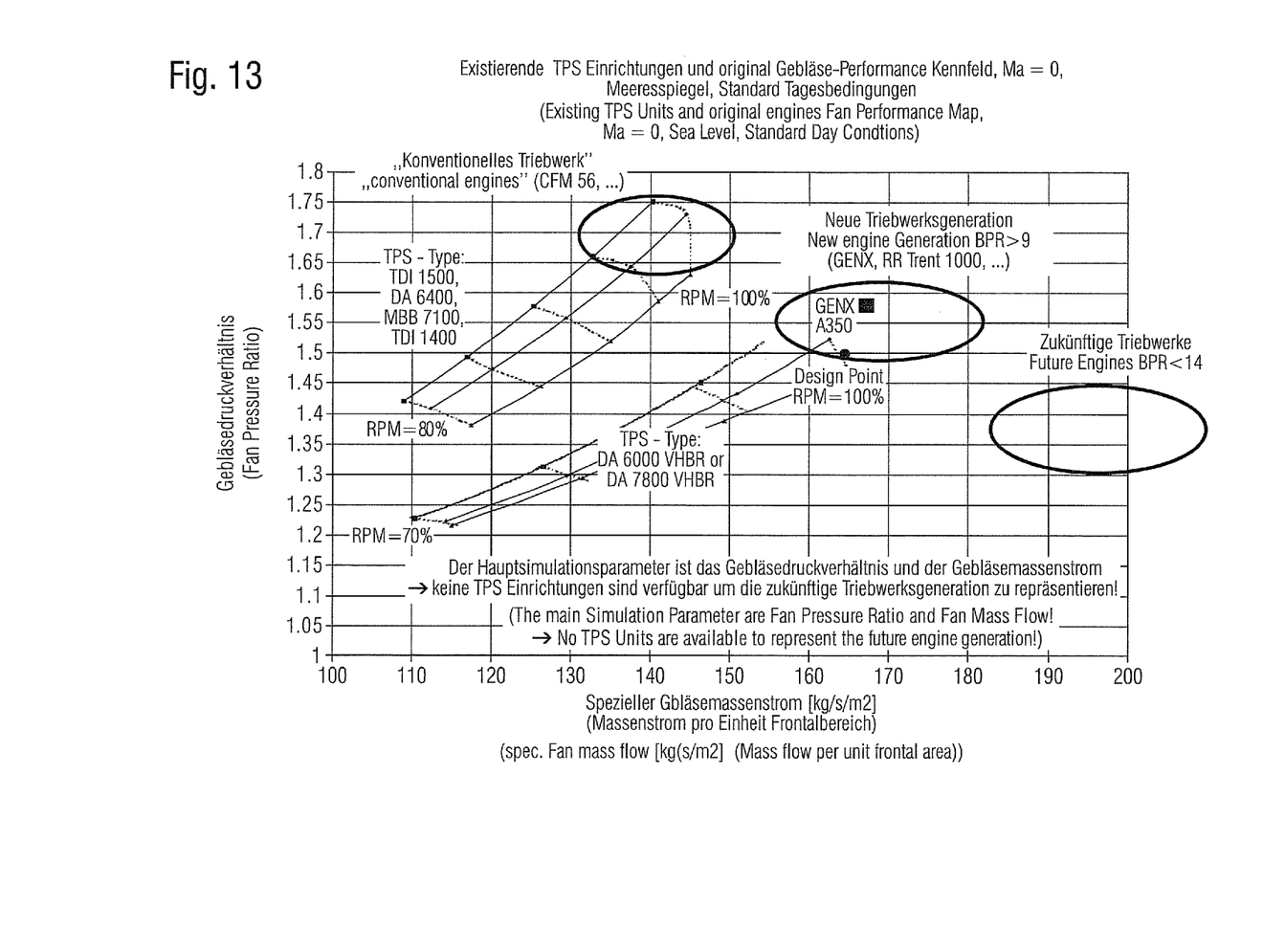
FIG. 13 a diagram, in which the specific fan mass flow is shown in relation to the fan pressure ratio for a plurality of engine generations.

In FIG. 13, a diagram and/or a fan performance operating map is shown, in which previous engines, new engines and expected future engines are illustrated.

The main parameters of the simulation are fan pressure ratio and the fan mass flow. In the operating map for the fan performance in FIG. 13, the fan mass flow is therefore provided in relation to the fan pressure. The operating map was made at a mach number of 0, at standard day conditions and at sea level. The bypass ratio BRP, that is the mass flow through the fan means in relation to the mass flow through the turbine means, has in conventional turbines, for example CFM56, been BPR <7. In engines of the new generation, for example GENX or RR TRENT 1000, the bypass ratio is BRP >9 and in the expected future engines BPR <14. As can be understood from FIG. 13, engine development, is, for example, going to see a larger fan mass flow at a smaller fan pressure ratio being achieved in an engine.

Figure 14:
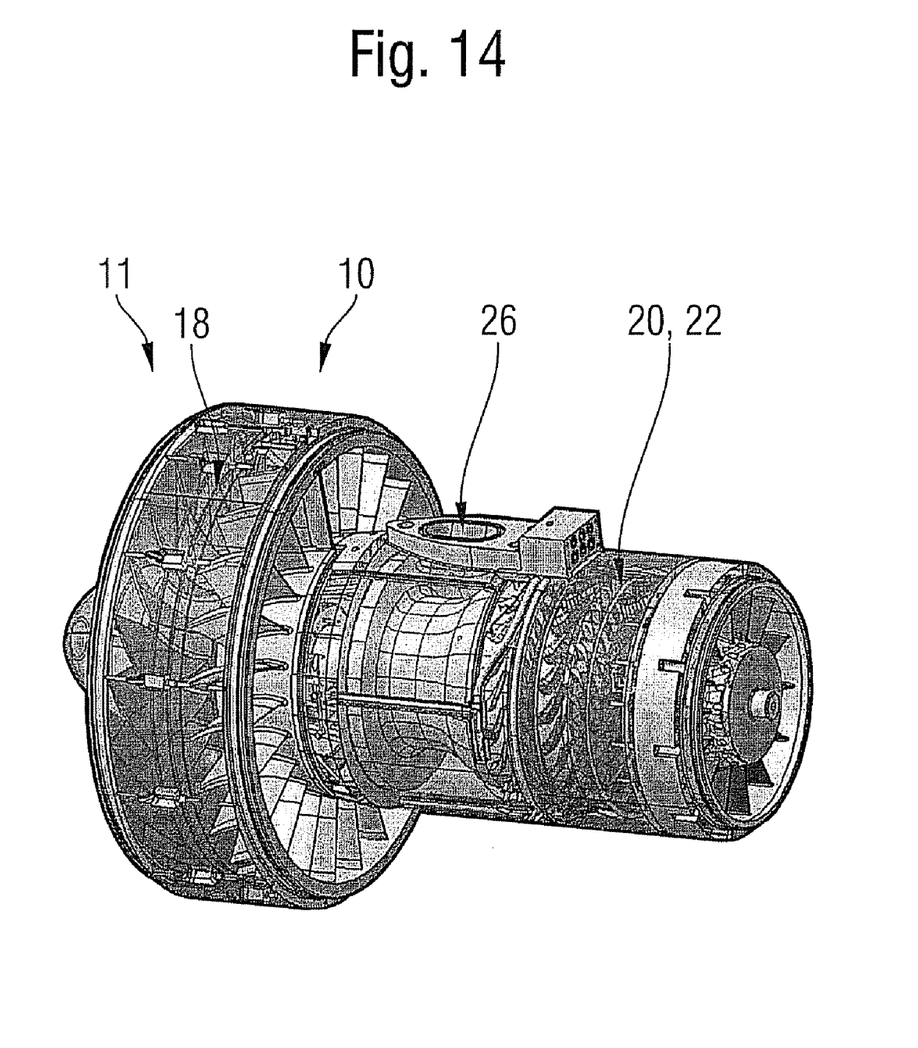
FIG. 14 a 3D-view of an engine simulation apparatus.

FIG. 14 shows a view of an engine simulation apparatus 10 without its attachment to a pylon and without the engine pod means. The engine simulation apparatus 10 has, for example, a fan means 18 and a subsequent turbine means 20, including a supply 26 for a driving medium for the turbine means 20, here, for example compressed air. According to the invention, the turbine means 20 can be provided as a module 38 and/or 40, for example, wherein it can be combined with different fan means 18, wherein the fan means 18 can have, for example, different diameters, different fan areas and/or different design in order to simulate different engines. The fan means, however, have a mass and a centre of gravity, which prevents unwanted resonant vibrations or at least reduces these. The mass and/or the centre of gravity of the fan means is the same/or potentially the same or the difference is sufficiently small first to at least reduce resonant vibrations or substantially prevent the same and/or the dynamic behaviour of the rotor system of the engine simulation apparatus being as similar as possible.

Figure 15:
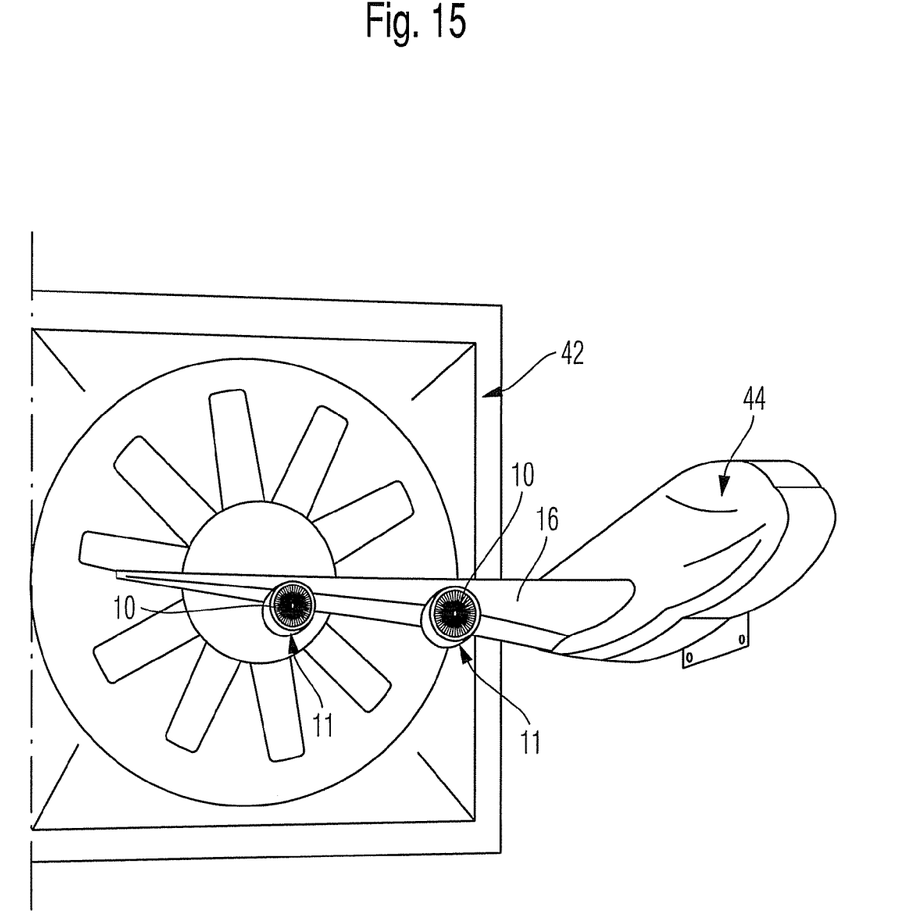
FIG. 15 a view of a wind tunnel and half of an aircraft of the type Airbus A380 with an installed engine simulation apparatus being arranged therein for testing, for example, of the engine jet influence on the aircraft forces of the half of the aircraft.

Further, in FIG. 15, an example of a wind tunnel 42 for testing of an aircraft model 44, here an airbus of the type A380, is shown. Therein, corresponding engine simulation apparatuses 10 in the wing 16 of the aircraft model 44 are installed to simulate both engines 11 on one side of the airbus of the type A380. The aircraft simulation apparatus 10 therein has a turbine means usually operated with pressurized air, which within a short period of time provides the necessary energy in order to drive the engines.

The modular system of the engine simulation apparatus has the advantage that it can be adapted to new designs and that parts of older simulation apparatuses can be used in future.

Even though the present invention has been described with reference to preferred embodiments, it is not limited to the same but it can be modified in numerous ways.

The invention claimed is:

1. An engine simulation apparatus, in particular for an engine of an aircraft or a spacecraft,
    wherein the engine simulation apparatus is of a modular design,
    wherein the engine simulation apparatus comprises:
    a module, which has a turbine means for driving of an engine of the engine simulation apparatus,
    wherein the turbine means is coupled with at least two fan means,
    wherein the at least two fan means for connecting with the engine simulation apparatus have at least one of the same mass and the same center of gravity.

2. The engine simulation apparatus according to claim 1, wherein the turbine means has a bearing housing means for supporting the turbine means.

3. The engine simulation apparatus according to claim 1, wherein the at least two fan means, coupled to the turbine means, have at least one of the same scaling, the same dimensions, and the same power performance.

4. The engine simulation apparatus according to claim 1, wherein the at least two fan means, coupled to the turbine means, have at least one of the same diameters and the same performance.

5. The engine simulation apparatus according to claim 1,
    wherein the fan means has a predefined fan range, and
    wherein the fan range is adapted for setting a predefined mach number.

6. The engine simulation apparatus according to claim 1,
    wherein at least one or more turbine operating maps are provided,
    wherein based on the corresponding turbine operating map, at least one of a turbine air mass flow and an inlet pressure for the engine is set.

7. The engine simulation apparatus according to claim 1, wherein the engine simulation apparatus is powered by at least one of a compressed air, and a turbine means of the engine simulation apparatus providing the engine compressed air.

8. The engine simulation apparatus according to claim 1, wherein a respective fan means is configured such as to at least provide for one of reducing and preventing resonant vibrations.

9. The engine simulation apparatus according to claim 1, wherein at least one of the design of the turbine means and rotor dynamics depends on the fan means.

10. The engine simulation apparatus according to claim 1, wherein the turbine simulation apparatus has at least one of a predefined power performance and machine dynamic performance.

* * * * *